United States Patent [19]

Kiessling et al.

[11] Patent Number: 4,728,555

[45] Date of Patent: Mar. 1, 1988

[54] PROCESS FOR THE PREPARATION OF BETA-HYDROXYPOLYAMINES BY REACTION OF EPOXY RESINS WITH AMMONIA

[75] Inventors: Hans-Joachim Kiessling, Eppstein/Taunus; Wilhelm Riemenschneider, Frankfurt am Main, both of Fed. Rep. of Germany

[73] Assignee: Hoechst AG, Fed. Rep. of Germany

[21] Appl. No.: 897,492

[22] Filed: Aug. 15, 1986

[30] Foreign Application Priority Data

Aug. 17, 1985 [DE] Fed. Rep. of Germany ....... 3529502
Jul. 18, 1986 [DE] Fed. Rep. of Germany ....... 3624313

[51] Int. Cl.$^4$ ..................... C08G 59/14; C07C 89/02
[52] U.S. Cl. ..................... 528/119; 525/523; 528/407; 564/325; 564/399; 564/475
[58] Field of Search ........... 525/523; 564/325, 399, 564/475; 528/119, 407

[56] References Cited

U.S. PATENT DOCUMENTS

| | | | |
|---|---|---|---|
| 4,174,333 | 11/1979 | Hartman et al. | 525/510 X |
| 4,291,147 | 9/1981 | Kempter et al. | 525/510 X |
| 4,310,645 | 1/1982 | Kempter et al. | 525/510 X |
| 4,310,646 | 1/1982 | Kempter et al. | 525/455 X |
| 4,363,710 | 12/1982 | Kempter et al. | 525/481 X |
| 4,528,363 | 7/1985 | Tominaga | 528/405 X |
| 4,594,403 | 6/1986 | Kempter et al. | 528/363 X |

FOREIGN PATENT DOCUMENTS 1221906 2/1971 United Kingdom .

*Primary Examiner*—Earl Nielsen
*Attorney, Agent, or Firm*—Bierman & Muserlian

[57] ABSTRACT

Process for the preparation of β-hydroxypolyamines by reaction of polyepoxide compounds with ammonia, in which at least one polyepoxide compound is treated in a first stage with liquid ammonia at temperatures below 50° C., a homogeneous phase being formed, after which the reaction between the polyepoxide compound and ammonia is carried out in a second stage at 60° to 130° C., and when the reaction is complete, the excess ammonia is removed from the reaction mixture.

The resulting β-hydroxypolyamines are used as binders or—in protonated form—as binders which can be diluted with water, by themselves or in combination with suitable crosslinking agents.

11 Claims, No Drawings

PROCESS FOR THE PREPARATION OF BETA-HYDROXYPOLYAMINES BY REACTION OF EPOXY RESINS WITH AMMONIA

The reaction of epoxide compounds with primary or secondary amines has frequently been described in the literature. In contrast, there are only a few references to the reaction between polyepoxides and ammonia.

German Offenlegungsschrift No. 1,495,537 describes the reaction of epoxide compounds with ammonia in the presence of emulsifiers and/or protective colloids.

German Offenlegungsschrift No. 1,947,879 describes the reaction of epoxy resins based on bisphenol A with ammonia to give $\beta$-hydroxypolyamines. The reaction is carried out with a large excess of ammonia, and a ratio of 50 to 100 mol of ammonia per epoxide equivalent is particularly preferred.

In German Auslegeschrift No. 2,914,331, which describes self-crosslinking cationic binders, di- or polyepoxide compounds are reacted with ammonia in proportions such that 1.75 to 10 mol of ammonia are present for each epoxide group.

If the embodiment examples of these publications are examined, it is found that in all cases the reactions are carried out in the presence of relatively large amounts of solvents. In German Offenlegungsschrift No. 1,947,879, for example, the solvent content is more than 85% by weight, preferably more than 90% by weight, based on the epoxy resin employed, and in German Auslegeschrift No. 2,914,331, it is more than 55% by weight. It is stated as an advantage that, by the solvents, mixing is facilitated, the viscosity is reduced and the heat exchange in the reaction mixtures is improved. However, no concrete information on the conditions under which a reaction of polyepoxides and ammonia is possible without using relatively large amounts of solvent is given in the literature.

Since relatively large amounts of solvents are employed in the reaction in the known processes, recovery of the solvents is necessary, that is to say distilled separation processes must be used to remove the unreacted ammonia from the solvent.

The object of the present invention is to provide a novel process which manages without relatively large amounts of solvents, and even without the addition of solvents, and thus operates more simply and more economically.

The invention thus relates to a process for the preparation of $\beta$-hydroxypolyamines by reaction of polyepoxides with ammonia, which comprises treating at least one polyepoxide compound with liquid ammonia in a first stage at temperatures below 50° C. in the absence of relatively large amounts of solvent or without any addition of a solvent, a homogeneous phase being formed, thereafter carrying out the reaction between the polyepoxide compounds and ammonia in a second stage at 60° to 130° C. and, when the reaction is complete, removing the excess ammonia from the reaction mixture.

The process according to the invention has the advantage that the reaction products contain no relatively large amounts of solvent to be removed by distillation or, in the case of the solvent-free procedure, no solvent residues at all, the heat energy of the reaction mixture is utilized during removal of the excess ammonia by distillation and an energy-saving, low-pollution process can thus be introduced. The ammonia recovered, in particular that from the solvent-free procedure, can be made available for subsequent batches without further purification.

The temperature in the first stage of the process is preferably below 30° C., whilst the temperature for complete reaction of the epoxide groups with ammonia is preferably 70° to 110° C. When the reaction has ended, the excess ammonia is removed from the reaction mixture during or after the cooling. The ammonia can advantageously be removed from the non-volatile $\beta$-hydroxypolyamine by distillation while letting down the pressure with cooling of the reaction mixture, so that the heat energy of the reaction batch is utilized to remove the excess ammonia.

The novel process facilitates on the one hand reaction, without the addition of a solvent, of viscous, liquid epoxide compounds which have more than one epoxide group in the molecule and have viscosities of more than 1,000 to 25,000 mPa.s, but in particular more than 3,000 to 15,000 mPa.s, at 25° C., and on the other hand also reaction of more highly viscous liquid or solid epoxy resins with small additions of solvent of 5 to 40% by weight, preferably 10 to 35% by weight, based on the amount of epoxide compound employed, if this addition of solvent reduces the viscosity of the epoxy resins to less than 25,000 mPa.s, preferably to less than 15,000 m.Pa.s, at 25° C. Possible solvents are alcohols, glycol ethers, aromatic hydrocarbons, aromatic-aliphatic hydrocarbons, and if appropriate also solvent mixtures. Solvents which are substantially less volatile than ammonia and have boiling points under normal pressure above 60° C., preferably above 80° C., such as ethanol, the butanols, ethylene glycol monomethyl ether, propylene glycol monomethyl ether, dipropylene glycol monomethyl ether, toluene and the xylenes, are preferred. The intended use of the polyamine to be prepared should also be taken into consideration when choosing the solvent.

Epoxide compounds with the following structures are particularly suitable for the process according to the invention:

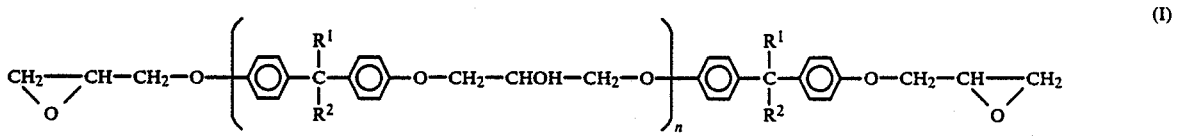

and/or (II)

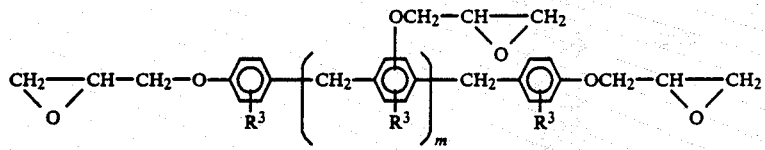

In the formulae, $R^1$, $R^2$ and $R^3$ denote hydrogen or aliphatic alkyl radicals with up to 4 carbon atoms, but preferably hydrogen or methyl groups. The average molecular weight is in general between 312 and 2,000, preferably 312 and 1,100, in the case of formula I and between 474 and 2,100, preferably between 474 and 1,200, in the case of formula II. Accordingly, n in formula I has average values of 0 to 5.9, preferably up to 2.6, and m in formula II has average values of 1 to 11, preferably 1 to 5.5.

The epoxy equivalent weights of the epoxy resins of the formula I are in general between about 150 and 1,000, preferably between 156 and 550, and in the resins of the formula II they are between about 230 and 1,050, preferably 237 and 600.

Epoxide compounds with structures of the formula I are obtained by reacting bisphenols and epichlorohydrin, and those with structures of the formula II are obtained from novolaks and epichlorohydrin. Mixtures of such compounds can also be used.

The mixing ratio between the polyepoxide and epoxy resin solution and ammonia depends on the equivalent weight of the epoxy resin employed. In the case of liquid epoxy resins with epoxide equivalent weights of less than 200, the mixing ratio is chosen so that 2.5 to 25 times, preferably 4 to 10 times, the amount by volume of ammonia is employed in comparison with the volume of epoxy resin employed (100%). In the case of epoxy resins with equivalent weights of more than 200, in particular more than 300, which are usually in the form of more highly viscous liquid epoxy resins or solid resins at temperatures from 10° to 25° C. and must therefore be liquefied by addition of solvents, such an excess of ammonia is no longer necessary because of the lower content of epoxide groups in these epoxy resins. The volume ratio of epoxy resin to ammonia is in general 1:0.3 to 2.5, preferably 1:0.4 to 1.9, in the case of these resins.

The duration of the first reaction stage, that is to say the conversion of the epoxide compound-ammonia mixture into a homogeneous phase at temperatures below 50° C., should be as short as possible. Intensive thorough mixing of epoxide compounds and ammonia at temperatures below 50° C., preferably below 30° C., is necessary for this. Mixers or mixing devices of the most diverse construction can be used for this. The first reaction stage can last seconds to hours, depending on the size, shape and geometry of the device and the nature of the thorough mixing. Devices in which the intensive thorough mixing is effected by vigorous shaking can also be used.

Since the intensive thorough mixing of the reaction partners is only of importance in the first stage, the second reaction stage can be carried out at 60° to 130° C. without particular mixing devices batchwise in a pressure vessel or continuously, for example in a tube reactor. The time for complete reaction of the epoxide groups in the second stage depends on the reaction temperature chosen. Reaction times of between 2 and 10 hours, in particular 2 and 5 hours, are in general sufficient.

After complete reaction of the epoxide groups in the second stage, the reaction mixture essentially consists only of the β-hydroxypolyamines and the excess ammonia used. The highly volatile ammonia can thus be removed from the less volatile solvent and polyamine without problems, and it is not necessary to use expensive distillative separation processes for working up the reaction product.

The β-hydroxypolyamines obtained by the process are suitable as the sole binders and as binders in combination with crosslinking agents for coatings and impregnations for fabrics or porous compositions, and furthermore—after protonation with acid—also as binders in aqueous systems.

The β-hydroxypolyamines prepared according to the invention are self-crosslinking and can therefore be used as binders by themselves. However, these β-hydroxypolyamines are advantageously employed with suitable crosslinking agents, utilizing the reactive NH and OH bonds present in the molecule.

Examples of suitable crosslinking agents are polyepoxide compounds or epoxy resins, polyfunctional compounds or resins which carry double bonds capable of Michael addition, polyisocyanates, polyurethanes, phenolic resins, amine resins, such as urea resins and melamine resins, polyfunctional compounds or resins with unstable ester bonds, such as malonic acid esters, acetoacetic acid ethyl esters and β-hydroxy esters. With the aid of such crosslinking agents, hardening of the β-hydroxypolyamines prepared according to the invention can be carried out within a wide temperature range, for example aromatic polyisocyanates already crosslink at temperatures below 0° C., trimethylolpropane triacrylate crosslinks at room temperature and malonic acid esters or acetoacetic acid esters crosslink in the temperature range from 80° to 150° C.

The β-hydroxypolyamines obtained by the process according to the invention can also be used with the crosslinking agents mentioned together with other binders which carry amine groups and/or hydroxyl groups.

Catalysts matched to the particular system in a manner known to the expert can be used during hardening of the abovementioned systems. For example, acids, such as salicylic acid, tertiary amines or aminophenols, such as dimethylaminophenol, are suitable for systems of β-hydroxypolyamines prepared according to the invention and epoxy resins.

Resins and compounds with functional groups for hardening the β-hydroxypolyamines according to the invention are listed below:

aliphatic polyepoxide compounds, for example epoxidized oils, such as epoxidized linseed oil or epoxidized soya oil, epoxidized cyclic compounds, such as vinylcyclohexenediepoxide, glycidyl ethers of hydrogenated bisphenol A, 3,4-epoxycyclohexylmethyl 3,4-epoxycyclo-hexanecarboxylate, epoxy resins based on epichlorohydrin and polyhydric alcohols, such as pentaerythritol, trimethylolpropane or sorbitol, aromatic epoxy resins, such as polyglycidyl ethers of polyfunctional phenols, for example glycidyl ethers of 4,4'-diphenylolmethane or -propane or polyglycidyl ethers of novolaks, glycidyl esters of aliphatic or aromatic polycarboxylic acids, for example terephthalic acid diglycidyl ester, or glycidylmethacrylate copolymers. Of these, combinations of the $\beta$-hydroxypolyamines prepared according to the invention and polyglycidyl ethers of polyfunctional phenols, such as (R)Beckopox EP 140, EP 301 and EP 304 from Hoechst AG (glycidyl ethers based on bisphenol A with epoxide equivalent weights of 190, 490 and 900 respectively) are distinguished by a particular reactivity, so that hardening is possible in the temperature range from 20° to 80° C.

Possible compounds or resins which carry double bonds which are capable of Michael addition are, for example, acrylic and/or methacrylic acid esters of polyhydric alcohols, such as trimethylolethane triacrylate or trimethylolpropane triacrylate and/or the corresponding methacrylic acid esters, butanedioldiacrylate and/or unsaturated polyesters based on fumaric and/or maleic acid. These polyesters can additionally contain any carboxylic acid component up to 70%, preferably up to 30%, of saturated carboxylic acid units which are at least dibasic and which contain no double bonds capable of Michael addition, such as ortho-, iso- or terephthalic acid, tetrahydrophthalic acid, hexahydrophthalic acid or adipic acid. Instead of acids, the corresponding anhydrides can of course also be used as starting substances in the preparation of the polyesters. Possible alcohols for the preparation of the unsaturated polyesters are preferably diols, such as ethylene glycol, 1,2- and 1,3-propanediol, diethylene glyclol and/or dipropylene glycol. Combinations of $\beta$-hydroxypolyamines prepared according to the invention and at least trifunctional acrylic acid esters, such as glycerol triacrylate, trimethylolethane triacrylate or trimethylolpropane triacrylate and pentaerythritoltetra-acrylate, are particularly reactive. Such combinations also harden below room temperature.

Suitable isocyanate compounds are aliphatic, cycloaliphatic, araliphatic, aromatic and/or heterocyclic mono- and polyisocyanates, for example (R)Desmodur N (trade name for a polyisocyanate based on hexamethylenediisocyanate), isophoronediisocyanate, toluylenediisocyanate and diphenylmethanediisocyanate. Combinations with polyisocyanates or resins which carry isocyanate groups crosslink by themselves very rapidly at temperatures below 0° C.

The polyisocyanates and/or resins which carry isocyanate groups mentioned in the preceding paragraph can be used with customary masking agents, such as phenols, alcohols, acetoacetic acid esters or $\epsilon$-caprolactam, for combinations with masked polyisocyanates. These combinations are stable at room temperature and in general harden only at temperatures above 100° C. In particular cases, for example when acetoacetic acid esters are used for the masking, crosslinking may also already start below 100° C.

Possible amine resins are, for example, commercially available urea resins and melamine resins. The hardening temperature of such combinations depends on the structure of the urea resins and melamine resins. Thus, for example, combinations with melamine resins of the hexamethoxymethylmelamine type harden only at temperatures above 150° C., whilst combinations with more reactive melamine resins, which are prepared with less formaldehyde and/or are etherified with secondary or tertiary alcohols, already crosslink below 100° C.

If the $\beta$-hydroxypolyamines prepared according to the invention are combined with compounds or resins which contain carboxylic acid and/or carboxylic acid ester and/or carboxylic acid anhydride groups, carboxylic acid amide or imide formation occurs. Such reactions take place, for example, with saturated alkyd resins, such as those based on isononaneric acid, phthalic anhydride and trimethylolpropane, since these resins also contain carboxyl groups, in addition to the ester groups. The hardening temperature depends on the reactivity of the carboxylic acid, carboxylic acid ester or carboxylic acid anhydride groups contained in the combination partner. Thus, for example, with polyfunctional compounds or resins which carry reactive carboxylic acid ester bonds of malonic acid or acetoacetic acid, it is possible to obtain combinations which already crosslink at 80°-120 ° C. with the resins containing amino groups prepared according to the invention and enable coatings to be formed, whilst the crosslinking temperature of combinations with the saturated alkyd resins mentioned is above 120° C., preferably above 150° C.

To overcome compatibility problems, it may be advantageous to precondense the resin containing amino groups prepared according to the invention with one of the abovementioned combination partners and, if appropriate, to combine the resulting precondensate with others of the abovementioned reaction partners. If esters of air-drying fatty acids, such as soya oil fatty acid or linseed oil fatty acid, are used, the precondensation, that is to say the amide or imide formation reaction which proceeds above 100° C. between the amino groups of the polymer resin and the ester or carboxylic acid groups, is advantageously carried out with exclusion of air. The combinations thus obtained as precondensates then harden in a manner similar to air-drying alkyd resins with atmospheric oxygen at room temperature, but in contrast to these are distinguished by improved initial drying with good complete drying. Possible esters of air-drying fatty acids here are those of monohydric alcohols, for example of methanol, or polyhydric alcohols, in particular those products in which some of the hydroxyl groups of the polyhydric alcohol are esterified with saturated carboxylic acids, as in long oil alkyd resins with phthalic acid.

With a corresponding choice of the $\beta$-hydroxypolyamines prepared according to the invention and the combination partners within a wide range, such combinations can be hardened to coatings, but also to adhesive layers and joint compositions with the desired properties, such as a good stability towards solvents.

The $\beta$-hydroxypolyamines prepared according to the invention are particularly suitable for processing from aqueous solution or aqueous dispersion, since water solubility, water dispersability and emulsifying power can be achieved for hydrophobic combination partners of the binders according to the invention by addition of acid, in particular carboxylic acid, due to the formation of cationic groups. The customary processes can be used for the production of coatings from these aqueous dispersions or aqueous solutions.

The desired properties in respect of water solubility and emulsifying power after addition of acid can be established by varying the content of basic nitrogen atoms. With products optimized in this manner, it is possible, after addition of acid and without using low molecular weight emulsifers, to prepare storage-stable aqueous solutions or aqueous dispersions from the β-hydroxypolyamines prepared according to the invention by themselves or a combination thereof with hydrophobic combination partners.

The β-hydroxypolyamines prepared according to the invention and combinations thereof can be processed to sheet-like shaped articles with or without pigments and/or fillers. When choosing the pigments and fillers, the particular envisaged processing of the binder-pigment-filler combination must be taken into account. If the binders according to the invention are employed, for example, as an aqueous solution or dispersion in which the amino groups are present as cations, alkaline pigments or fillers, such as zinc oxide or calcium carbonate, cannot of course be used. Acid pigments or fillers can influence certain crosslinking reactions, such as the reaction with double bonds which are capable of Michael addition, by salt formation or conversion of the basic nitrogen groups into cations.

It is of course also possible for mixtures to be used instead of uniform products in all cases, that is to say, for example, mixtures of epoxy resins of the formula I and II in the ammonia reaction.

In the protonated form, such binder combinations are particularly suitable for cataphoretic lacquering by dipping of electrically conducting articles. Because they are free from solvents or have a low content of organic solvents, protonated β-hydroxypolyamines are of particular interest in large car body dipping baths, since the use of binders with the lowest possible content of organic solvents in the dipping bath is aimed for here.

EXAMPLES (1) One liter=1.16 kg of epoxy resin based on bisphenol A-epichlorohydrin with an epoxide equivalent weight of 190 and a viscosity of 13,000 mPa.s at 25° C. and 6 liters of liquid ammonia are mixed at 20° C. for 8 hours in an autoclave with a lift-thrust mixer and electrical heating. Thereafter, the mixture was heated to 80° C. and kept at this temperature for 5 hours, a pressure of about 50 bar being established.

After cooling to about 30° C., the autoclave pressure was let down via a rising pipe, so that most of the ammonia evaporated. It was collected in a cold trap and used again in this form. The foamy crystalline white mass which remained was comminuted in a mortar and the white powder formed was freed from the last traces of ammonia in a drying cabinet under reduced pressure at 25°-35° C. Yield: 1,250 g, melting point: 82° C., amine number: 261 mg of KOH equivalents/g, OH number: 301 mg of KOH equivalents/g, melt viscosity (110° C.): 3,500 mPa.s.

(2) 50 g of epoxy resin as in Example 1 were introduced into a shaken autoclave and 290 g of ammonia were cocondensed at −40° C. The reaction mixture was kept at 20° C. for 24 hours, with shaking. It was then heated to 80° C. and kept at this temperature for 4 hours. After the working up described in Example 1, a product with the following data was obtained: melting point: 103° C., melt viscosity (110° C.): 2,100 mPa.s.

(3) Example (2) was repeated, with the difference that the reaction mixture was kept at 20° C. for only 1 hour and was then subjected to 80° C. for a reaction time of 4 hours. Melting point: 104° C., melt viscosity (110° C.): 4,100 mPa.s.

(4) Comparison: Example (2) was repeated, with the differenre that, immediately after the ammonia had been cocondensed, the reaction mixture was heated to 8°0 C. in the course of 90 minutes and was kept at this temperature for 4 hours. On working up of the residue, 40% of the resulting product was non-fusable. The fusible content had a melting point of 90° to 93° C. and a melt viscosity (110° C.) of 25,000 mPa.s.

(5) 37.5 g of solid epoxy resin based on bisphenol A-epichlorohydrin and corresponding to the formula I ($R^1$ and $R^2$=$CH_3$), with an epoxide equivalent weight of 490 and a Durrans softening point of 70° C., were dissolved in 12.5 g of xylene in a shaken autoclave and 0.1 liter of liquid ammonia was cocondensed at −50° C. The reaction mixture was brought to room temperature, with shaking, whereupon two liquid phases formed, namely 0.1 liter of a phase of higher specific gravity containing the synthetic resin and a very mobile upper phase consisting exclusively of ammonia. The formation of these two phases on heating up from −50° C. to +25° C. was observed in a parallel experiment in a glass autoclave. After the autoclave had been shaken at 25° C. for 2 hours, it was heated up to 80° C. and kept at this temperature for 4 hours. The mixture was worked up as described in Example (1). A solid fusible product free from ammonia and xylene and with an amine number of 105 mg of KOH equivalents/g was thereby obtained.

(6) Example (5) was repeated, with the difference that only 0.043 liters of ammonia were cocondensed. Only one liquid phase was thereby formed, and, after being kept at room temperature for 2 hours, with shaking, was heated to 80° C. and kept at this temperature for 4 hours. After working up according to Example (1), a solid fusible product free from ammonia and xylene and with an amine number of 106 mg of KOH equivalents/g was obtained.

Discussion of the Results

Examples 1 to 4 show that the procedure in the first stage has a marked influence on the end product. It can be clearly seen, for example, that if the reaction material is treated in the first stage for a longer period, the viscosity of the end product decreases, whilst an immediate increase in the temperature of the mixture to the reaction temperature effects formation in part of non-fusible portions and a considerable increase in the viscosity of the fusable portion.

In Examples 5 and 6, the mixing ratio of the solid epoxy resin of the formula I, liquefied with a little solvent and having a low content of epoxide groups, to ammonia is varied. Whilst the ratio was 1:3.6 in Example 5, it was reduced to 1:1.6 in Example 6. No noticeable change in the properties of the end product thereby occurred.

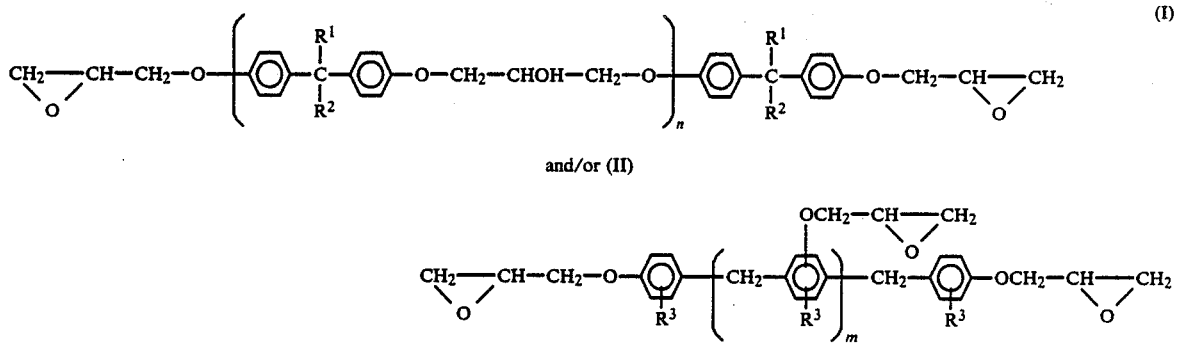

We claim:

1. A process for the preparation of a β-hydroxypolyamine consisting essentially of treating at least one polyepoxide compound with liquid ammonia in a first stage at a temperature below 50° C., a homogeneous phase, reacting the homogenous phase in a second stage at 60° to 130° C. in the presence of 0 to 40% by weight of a solvent, based on the weight of the polyepoxide empolyed, and when the reaction is complete, recovering excess ammonia from the reaction mixture to obtain a β-hydroxypolyamine.

2. Process as claimed in claim 1, wherein the temperature in the first stage is below 30° C.

3. Process as claimed in claim 1, wherein the temperature in the first stage is between 10° and 25° C.

4. Process as claimed in claim 1, wherein the temperatures in the second stage are 60 to 130.

5. Process as claimed in claim 1, wherein a viscous, liquid epoxide compound with more than one epoxide group in the molecule is reacted without the addition of a solvent.

6. Process as claimed in claim 1, wherein a more highly viscous liquid epoxide compound or a solid epoxy resin with more than one epoxide group per molecule is reacted with ammonia in the presence of 5–40% by weight of a solvent, based on the amount of epoxide compound employed.

7. Process as claimed in claim 1, wherein an epoxide resin of the formula (I)

in which $R^1$, $R^2$ and $R^3$ are alkyl groups with up to 4 carbon atoms, n has average values from 0 to 5.9, and m has average values from 1 to 11 is reacted.

8. Process as claimed in claim 7, wherein $R^1$, $R^2$ and $R^3$ are hydrogen or methyl.

9. Process as claimed in claim 7, wherein the epoxy resin (I) has an average molecular weight of 312 to 2,000, and an epoxide equivalent weight of between 150 and 1,000, and the epoxy resin (II) has an average moleculare weight of 474 to 2,100, and an epoxide equivalent weight between 230 and 1,050.

10. Process as claimed in claim 5, wherein an epoxy compound which has a viscosity of 1,000 to 25,000 mPa.s (25° C.) is reacted.

11. Process as claimed in claim 6, wherein the viscosity of the mixture of epoxide compound and solvent employed is less that 25,000 mPa.s (25° C).

* * * * *